S. HANSING.
PIANO ACTION.
No. 11,055. Reissued Jan. 14, 1890.
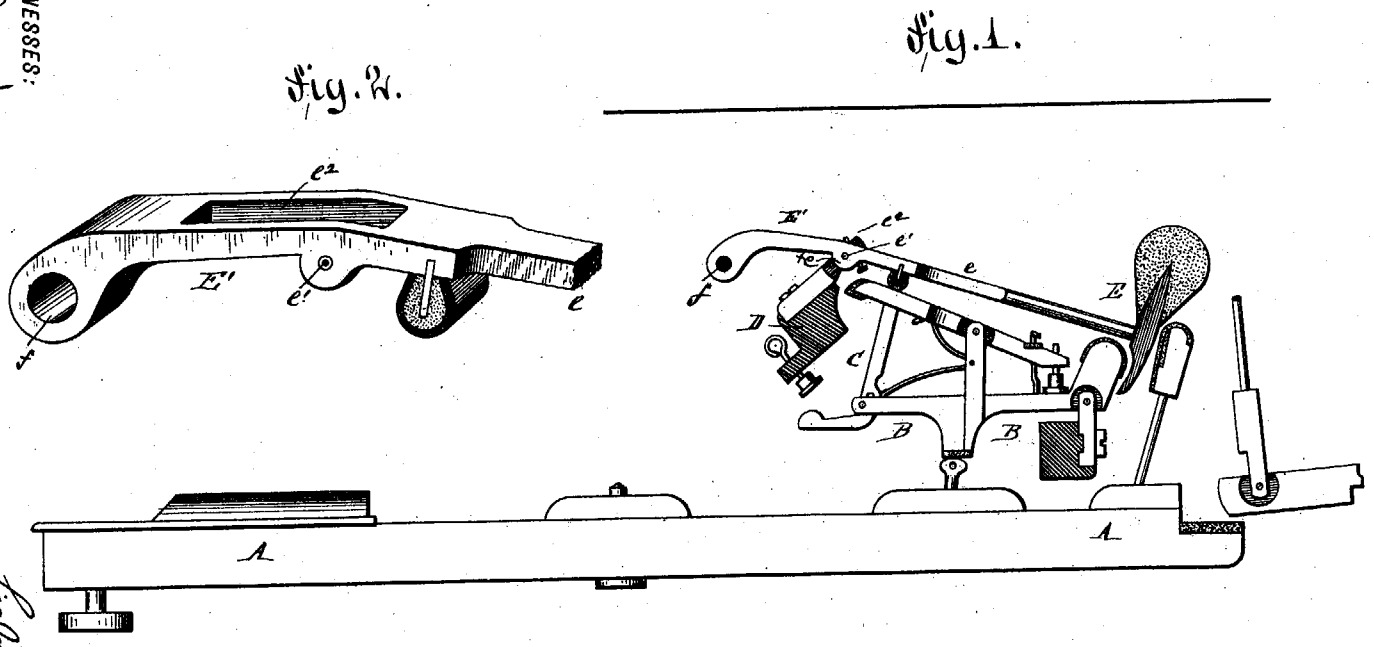
WITNESSES:
F. H. Rosenbaum.
W. Reinherr
INVENTOR
Siegfried Hansing
BY
Goepel & Haegener
ATTORNEYS.
N. PETERS, Photo-Lithographer, Washington, D. C.

UNITED STATES PATENT OFFICE.

SIEGFRIED HANSING, OF NEW YORK, N. Y.

PIANO-ACTION.

SPECIFICATION forming part of Reissued Letters Patent No. 11,055, dated January 14, 1890.

Original No. 404,704, dated June 4, 1889. Application for reissue filed September 3, 1889. Serial No. 322,906.

*To all whom it may concern:*

Be it known that I, SIEGFRIED HANSING, of New York, in the county of New York and State of New York, have invented certain new and useful Improvements in Piano-Actions; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

Owing to the large and heavy felt heads of the hammers in grand-piano actions, not only the lifting of the hammer by the jack is rendered less easy, but also for the purpose of facilitating repetition a stiff wire spring is interposed between the jack-lever and the lifting-lever of the hammer, whereby a considerable part of the free rebounding motion of the hammer is lost. Another objection is that by the dropping of the heavy hammer-heads on the hammer-checks a peculiar rebounding influence is exerted upon the action, and that in addition thereto the key-levers have to be leaded for balancing the heavy hammer-heads, whereby the ready play of the action is impeded and the quick response of the action to the touch retarded.

This invention is designed to overcome the defects mentioned by counterbalancing the weight of the hammer-head by means of a balancing device applied to the hammer-butt; and the invention consists of a grand-piano action in which the shank of the hammer is extended beyond the hammer-pivot, and provided with a balancing tail end having an enlarged eye that may be filled with lead, so as to counterbalance the head. The hammer is further provided near the pivot with a slotted opening for the inclined hammer-flange, which is attached to an inclined hammer-rail. The hammer is operated by a jack that acts on the shank of the hammer in front of the pivot of the same, so as to produce the lifting action on the counterbalancing-hammer.

In the accompanying drawings, Figure 1 represents a side elevation of a grand-piano action with my improved balanced hammer. Fig. 2 is a perspective view of the balancing extension of the hammer, drawn on a larger scale.

Similar letters of reference indicate corresponding parts.

In the drawings, A represents the key-lever; B, the jack-lever; C, the jack; D, the hammer-rail, and E the hammer, the shank $e$ of which is pivoted at its butt to the hammer-rail in the usual manner. The hammer-rail is arranged at an angle of inclination and supports an inclined hammer-flange $e^2$, to which the butt of the hammer E is pivoted. The remaining accessories of the action are the same as in the well-known Erard grand-piano action, as my improvement is confined to the construction of the hammer and hammer-rail. The hammer-shank $e$ is extended to some distance beyond the hammer-pivot $e'$, so as to form a counterbalancing tail end E′, which is provided with a perforated enlargement or eye $f$, and near the pivot $e'$ with a slotted opening $e^2$ for the inclined hammer-flange $e^3$ of the hammer-rail. The hammer E is provided with perforated ears $e^\times$ below its butt, one at each side of the slotted opening $e^2$ of the hammer-shank. The pivot $e'$ passes through the ears $e^\times$ and the upper end of the hammer-flange $e^3$. The hammer-flange $e^3$ is provided in front of the pivot $e'$ with a regulating-screw $f$, as shown clearly in Fig. 1. The perforated downwardly-extending ears $e^\times$ of the hammer-butt have the advantage of bringing the pivot $e'$ below the hammer-butt and of providing thereby the necessary space for the position of the regulating-screw $f$, which position is determined by its relative position to the jack-lever. The inclination of the hammer-rail D and flange $e^3$ provides the required space for the unobstructed oscillations of the counterbalancing tail end E′. The eye $f$ is leaded for balancing the heavier heads of the bass-hammers, while for balancing the lighter heads of the treble-hammers the lead filling can be reduced in size or entirely dispensed with. By the counterbalancing tail end E′ of the hammer E the hammer-head is balanced to some extent, and thereby the motion of the hammer greatly facilitated, owing to the momentum imparted to the same by the counterbalancing tail end E′. As the counterbalancing tail end E′ counterbalances the weight of the hammer-head, the heavier bass-hammers move as easily as the lighter treble-hammers, by which arrangement the free motion of the action is greatly facilitated, the leading of the key-levers dispensed with, and other defects inherent to the construction of the grand-piano actions heretofore in use almost entirely obviated.

Having thus described my invention, I claim as new and desire to secure by Letters Patent—

1. In a grand-piano action, a hammer the shank of which is extended beyond the pivot of the hammer, the extension being provided with a slotted opening and with a perforated enlargement or eye at the tail end, substantially as set forth.

2. The combination of an inclined hammer-rail, an inclined hammer-flange attached to said rail, and a counterbalanced hammer pivoted to the upper end of said flange and provided with a slotted opening extending at both sides of the pivot-connection, substantially as set forth.

3. In a grand-piano action, the combination of an inclined hammer-rail, a hammer-flange attached thereto, a counterbalanced hammer having a slotted opening in the butt for the hammer-flange and perforated ears below the butt, and a pivot passing through said ears and the hammer-flange, substantially as set forth.

4. In a grand-piano action, the combination of an inclined hammer-rail, a hammer-flange attached thereto, a counterbalanced hammer having a slotted opening in its butt and perforated ears extending below the butt, a pivot passing through said ears and the hammer-flange, and a regulating-screw passing through the hammer-flange in front of the hammer-pivot, substantially as set forth.

In testimony whereof I affix my signature in presence of two witnesses.

SIEGFRIED HANSING.

Witnesses:

PAUL GOEPEL,

JOHN ALONZO STRALEY.